US009693427B2

United States Patent
Fiedler et al.

(10) Patent No.: US 9,693,427 B2
(45) Date of Patent: Jun. 27, 2017

(54) RGBW CONTROLLER

(71) Applicant: Fibar Group sp. z o.o., Poznan (PL)

(72) Inventors: Maciej Fiedler, Poznan (PL);
Bartlomiej Arcichowski, Poznan (PL);
Adam Pudlowski, Kutno (PL)

(73) Assignee: FIBAR GROUP S.A., Poznan (PL)

( * ) Notice: Subject to any disclaimer, the term of this patent is extended or adjusted under 35 U.S.C. 154(b) by 0 days.

(21) Appl. No.: 14/590,986

(22) Filed: Jan. 6, 2015

(65) Prior Publication Data

US 2015/0194127 A1     Jul. 9, 2015

Related U.S. Application Data

(60) Provisional application No. 61/924,195, filed on Jan. 6, 2014.

(51) Int. Cl.
*H05B 37/02* (2006.01)
*G05B 15/02* (2006.01)
*H04L 12/28* (2006.01)

(52) U.S. Cl.
CPC ......... *H05B 37/0245* (2013.01); *G05B 15/02* (2013.01); *H04L 12/283* (2013.01); *H04L 12/2827* (2013.01); *G05B 2219/2642* (2013.01)

(58) Field of Classification Search
CPC ............ H05B 37/0245; H04L 12/2827; H04L 12/283; G05B 15/02; G09G 3/2022;
(Continued)

(56) References Cited

U.S. PATENT DOCUMENTS 3,873,927 A     3/1975 Overall
D301,869 S     6/1989 Schwartz
(Continued)

FOREIGN PATENT DOCUMENTS

CA           70745       6/1992
CA           74034       3/1994
(Continued)

OTHER PUBLICATIONS

Automated Home, Case Study: UK Z-Wave Home Automation Setup, www.automatedhome.co.uk/installaton/case-study-uk-z-wave-home-automation-setup.html (13 pages), Jun. 17, 2014.
(Continued)

*Primary Examiner* — Fred Tzeng
(74) *Attorney, Agent, or Firm* — McAndrews, Held & Malloy, Ltd.

(57) ABSTRACT

A control system for use in a network. The control system includes an input device coupled to the network to generate an input signal. The control system also includes an RGBW controller having a plurality of input channels and a plurality of output channels, and is coupled to the network. The RGBW receives the input signal at the input channels, determines if the input signal meets a predetermined condition, and generates a series of independent output signals at the plurality of output channels in response to the input signal meeting a predetermined condition. The control system also includes one or more output devices to receive one or more of the independent output signals, and to perform one or more functions in response to receiving one or more of the independent output signals.

17 Claims, 5 Drawing Sheets

(58) Field of Classification Search
CPC .. G09G 3/3291; G09G 3/2092; G09G 3/3607;
G09G 3/2003; G09G 5/02
USPC .......................................................... 345/690
See application file for complete search history.

(56) References Cited

U.S. PATENT DOCUMENTS

| | | |
|---|---|---|
| D325,902 S | 5/1992 | Hudson et al. |
| D334,561 S | 4/1993 | Crater et al. |
| D349,687 S | 8/1994 | Khoo et al. |
| D359,043 S | 6/1995 | Althans |
| D381,633 S | 7/1997 | Hiyakumoto et al. |
| D396,471 S | 7/1998 | Kolinen |
| D402,909 S | 12/1998 | Stanuch |
| D405,424 S | 2/1999 | Winkler et al. |
| D417,871 S | 12/1999 | Hisatsune |
| D481,056 S | 10/2003 | Kawasaki et al. |
| D487,728 S | 3/2004 | Murray |
| D489,337 S | 5/2004 | Murray |
| D492,262 S | 6/2004 | Murray |
| D494,583 S | 8/2004 | Guerrera |
| 6,892,751 B2 | 5/2005 | Sanders |
| D513,497 S | 1/2006 | Whitehouse |
| D514,118 S | 1/2006 | Christianson |
| D520,500 S | 5/2006 | Storti et al. |
| D521,403 S | 5/2006 | Shain et al. |
| D523,873 S | 6/2006 | Huang |
| D533,186 S | 12/2006 | Chen et al. |
| D533,851 S | 12/2006 | Yoon |
| D540,752 S | 4/2007 | Hayes et al. |
| 7,206,645 B2 | 4/2007 | Seguin |
| D541,762 S | 5/2007 | Nakagawa et al. |
| D548,702 S | 8/2007 | Girard |
| 7,253,741 B2 | 8/2007 | Fiorletta et al. |
| 7,309,216 B1 | 12/2007 | Spadola, Jr. et al. |
| D559,233 S | 1/2008 | Tang |
| D567,187 S | 4/2008 | Oba et al. |
| D570,297 S | 6/2008 | Gibbons et al. |
| D588,484 S | 3/2009 | Bandringa et al. |
| D604,254 S | 11/2009 | Lanfear et al. |
| D604,725 S | 11/2009 | Chen |
| D609,701 S | 2/2010 | Hou |
| D610,479 S | 2/2010 | Shi |
| D621,287 S | 8/2010 | Kaneko et al. |
| D631,165 S | 1/2011 | Fisher et al. |
| D631,446 S | 1/2011 | Lanfear et al. |
| D638,372 S | 5/2011 | Clymer et al. |
| D639,752 S | 6/2011 | Li et al. |
| D646,640 S | 10/2011 | Clymer et al. |
| D647,504 S | 10/2011 | Choi |
| 8,154,398 B2 | 4/2012 | Rolf et al. |
| D660,261 S | 5/2012 | Huang et al. |
| D660,809 S | 5/2012 | Kern Koskela et al. |
| D664,460 S | 7/2012 | Aurongzeb et al. |
| D665,290 S | 8/2012 | Bhate et al. |
| D665,773 S | 8/2012 | Behringer |
| D671,851 S | 12/2012 | Treharne et al. |
| D678,097 S | 3/2013 | Elwell et al. |
| D678,258 S | 3/2013 | Seto |
| D680,015 S | 4/2013 | Hauser et al. |
| D682,777 S | 5/2013 | Gupta et al. |
| D683,251 S | 5/2013 | Dumas et al. |
| D689,441 S | 9/2013 | Kah, Jr. et al. |
| D692,332 S | 10/2013 | Ni et al. |
| D693,311 S | 11/2013 | Biller et al. |
| D695,234 S | 12/2013 | Santiago |
| D695,693 S | 12/2013 | Lee et al. |
| D699,177 S | 2/2014 | Higashi |
| D703,156 S | 4/2014 | Parsons et al. |
| D703,566 S | 4/2014 | Chen et al. |
| D704,625 S | 5/2014 | Tsutsumi et al. |
| D705,719 S | 5/2014 | Wong |
| D706,152 S | 6/2014 | Ni et al. |
| D706,228 S | 6/2014 | Ishiura |
| 8,836,522 B2 | 9/2014 | Thorpe et al. |
| 2003/0058494 A1* | 3/2003 | Roberts ............ H04B 10/0793 398/43 |
| 2008/0133063 A1 | 6/2008 | Bisson et al. |
| 2008/0219664 A1* | 9/2008 | Zaacks ............. H04J 14/0227 398/58 |
| 2009/0231129 A1 | 9/2009 | Edwards et al. |
| 2009/0240377 A1 | 9/2009 | Batzler et al. |
| 2011/0012726 A1 | 1/2011 | Jessiman et al. |
| 2011/0061014 A1 | 3/2011 | Frader-Thompson et al. |
| 2011/0093217 A1 | 4/2011 | Kates |
| 2011/0130880 A1 | 6/2011 | Nishino et al. |
| 2011/0289561 A1 | 11/2011 | Ivanov et al. |
| 2012/0130513 A1 | 5/2012 | Hao et al. |
| 2013/0082835 A1 | 4/2013 | Shapiro et al. |
| 2013/0145826 A1 | 6/2013 | Richarz et al. |
| 2013/0222414 A1* | 8/2013 | Ito .......................... G09G 5/02 345/600 |
| 2013/0241479 A1 | 9/2013 | Wright, Jr. et al. |
| 2013/0279515 A1* | 10/2013 | Vijayasankar ........ H04L 47/805 370/462 |
| 2013/0321477 A1* | 12/2013 | Gandhi ................ G09G 3/2022 345/690 |
| 2014/0003073 A1* | 1/2014 | Rittner ..................... A62B 7/08 362/508 |
| 2014/0005809 A1 | 1/2014 | Frei et al. |
| 2014/0043357 A1* | 2/2014 | Yamato ................ G09G 3/3607 345/603 |
| 2014/0320546 A1* | 10/2014 | Lim ..................... G09G 3/3291 345/690 |
| 2015/0088283 A1* | 3/2015 | Fiedler ................. H04L 12/282 700/83 |
| 2015/0088331 A1* | 3/2015 | Fiedler ....................... G05F 1/66 700/295 |
| 2015/0091950 A1* | 4/2015 | Park ..................... G09G 3/3291 345/690 |
| 2015/0103105 A1* | 4/2015 | Kim ..................... G09G 3/2092 345/690 |
| 2015/0249881 A1* | 9/2015 | Ruan ......................... H04R 3/00 700/94 |
| 2015/0315694 A1* | 11/2015 | Zhang ...................... C23C 10/14 427/250 |
| 2015/0363912 A1* | 12/2015 | Elliott ......................... G09G 5/10 348/277 |
| 2015/0365643 A1* | 12/2015 | Shi ............................ H04N 9/64 348/294 |
| 2016/0043305 A1* | 2/2016 | Ochiai ..................... H01L 43/10 257/421 |
| 2016/0043896 A1* | 2/2016 | Fiedler ................. H04L 41/0803 370/254 |
| 2016/0057367 A1* | 2/2016 | Lee ........................... H04N 9/045 348/164 |
| 2016/0117968 A1* | 4/2016 | Buckley ................ G09G 3/2003 345/590 |

FOREIGN PATENT DOCUMENTS

| | | |
|---|---|---|
| CA | 74569 | 8/1994 |
| CA | 74610 | 8/1994 |
| CN | 3274285 | 1/2003 |
| CN | 301936325 S | 5/2012 |
| CN | 201230432179X | 6/2013 |
| CN | 302767627 S | 3/2014 |
| DE | 4029615 A1 | 4/1992 |
| EP | 0241676 A2 | 10/1987 |
| EP | 000137351-0008 | 2/2004 |
| EP | 000145644-0001 | 3/2004 |
| EP | 000166350-0001 | 4/2004 |
| EP | 000242888-0001 | 10/2004 |
| EP | 000253380-0002 | 11/2004 |
| EP | 000268032-0002 | 12/2004 |
| EP | 000321971-0007 | 4/2005 |
| EP | 000352943-0001 | 6/2005 |
| EP | 000481304-0001 | 2/2006 |
| EP | 000536438-0001 | 5/2006 |
| EP | 000603709-0002 | 10/2006 |
| EP | 000623608-0001 | 11/2006 |
| EP | 000757620-0004 | 7/2007 |

(56) References Cited

FOREIGN PATENT DOCUMENTS

| | | |
|---|---|---|
| EP | 000779061-0001 | 8/2007 |
| EP | 000792791-0001 | 9/2007 |
| EP | 000827118-0001 | 11/2007 |
| EP | 000830542-0006 | 11/2007 |
| EP | 000883269-0001 | 2/2008 |
| EP | 001015788-0001 | 10/2008 |
| EP | 001032437-0001 | 11/2008 |
| EP | 001032437-0002 | 11/2008 |
| EP | 001057392-0001 | 12/2008 |
| EP | 001223457-0002 | 6/2010 |
| EP | 001720590-0001 | 6/2010 |
| EP | 001781188-0001 | 11/2010 |
| EP | 001259204-0001 | 2/2011 |
| EP | 001828070-0001 | 2/2011 |
| EP | 001295182-0001 | 9/2011 |
| EP | 001914029-0004 | 9/2011 |
| EP | 001920018-0004 | 9/2011 |
| EP | 002041764-0001 | 5/2012 |
| EP | 002074989-0001 | 7/2012 |
| EP | 002079673-0001 | 7/2012 |
| EP | 002143784-0002 | 11/2012 |
| EP | 002163360-0001 | 1/2013 |
| EP | 002177667-0001 | 2/2013 |
| EP | 002242800-0001 | 5/2013 |
| EP | 002278887-0001 | 7/2013 |
| EP | 002293415-0002 | 8/2013 |
| EP | 002440198-0001 | 4/2014 |
| EP | 002465476-0002 | 5/2014 |
| JP | 1177905 S | 6/2003 |
| JP | 1203574 S | 4/2004 |
| JP | 1220720 S | 10/2004 |
| JP | 1333401 S | 6/2008 |
| JP | 1348157 S | 1/2009 |
| JP | 1400836 S | 11/2010 |
| JP | 1422635 S | 9/2011 |
| JP | 1463123 S | 2/2013 |
| JP | 1491697 S | 3/2013 |
| JP | 1386160 S | 4/2013 |
| JP | 1471658 S | 6/2013 |
| JP | 1475417 S | 7/2013 |
| JP | 1477025 S | 8/2013 |
| JP | 1477336 S | 8/2013 |
| JP | 1400674 S | 10/2013 |
| JP | 1498774 S | 6/2014 |
| WO | DM053972 | 11/2000 |
| WO | DM/058681 | 11/2001 |
| WO | DM059634 | 3/2002 |
| WO | DM066764 | 5/2005 |
| WO | DM/074389 | 9/2010 |
| WO | DM074708 | 11/2010 |
| WO | DM075611 | 12/2010 |
| WO | DM075517 | 2/2011 |
| WO | DM076583 | 5/2011 |
| WO | DM078408 | 11/2011 |
| WO | DM079061 | 2/2012 |
| WO | DM078643 | 6/2012 |
| WO | DM078737 | 7/2012 |
| WO | DM079877 | 12/2012 |
| WO | DM081654 | 8/2013 |
| WO | DM082066 | 10/2013 |
| WO | DM083551 | 2/2014 |

OTHER PUBLICATIONS

The Online Architecture and Design Exhibition, Interface Module for Home Automation System—EXB-REL8—AMX—Videos, www.archiexpo.com/prod/amx/interface-module-home-automation-systems-51274-1065061.html (18 pages), Jun. 17, 2014.

Graves on SOHO Technology, Vera Home Automation, Michael Graves, Oct. 23, 2008, www.mgraves.org/2008/10/vera-home-automation/ (6 pages), Jun. 17, 2014.

TaHomA—Home Motion by Somfy, Somfy Systems, Creator of TaHomA, the New Home Control System, www.somfytahoma.com/home-automation-products/home-automation-controllers-products/home-automation-somfy--tahoma-controller (3 pages), Jun. 17, 2014.

Introduction to X10 Home Automation Technology, by Tony Northrup, Jan. 10, 2005, www.oreillynet.com/pub/a/network/2005/01/10/x10_hmhck.html (5 pages), Jun. 17, 2014.

Fibaro Flood Sensor URL: http://www.fibaro.comien/the-fibaro-system/flood-sensor.

Wireless Leakage Sensor URL: http://smarthome01.com/2014/03/03/wireless-leakage-sensor/.

Occupancy Sensor URL: http://www.tech-faq.com/occupancy-sensors.html.

* cited by examiner

RGBW CONTROLLER

CLAIM OF PRIORITY/INCORPORATION BY REFERENCE

This patent application makes reference to, claims priority to and claims benefit from U.S. Provisional Patent Application Ser. No. 61/924,195 entitled "RGBW Controller" filed on Jan. 6, 2014, which is hereby incorporated herein by reference in its entirety.

TECHNICAL FIELD

Aspects of the present disclosure relate to electronic systems and/or networking More specifically, certain implementations of the present disclosure relate to an RGBW controller.

BACKGROUND

Existing methods and systems for providing device monitoring or control can be costly, cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for an RGBW controller, substantially as shown in and/or described in connection with at least one of the figures, as set forth more completely in the disclosure and/or the claims.

These and other advantages, aspects and novel features of the present disclosure, as well as details of illustrated implementation(s) thereof, will be more fully understood from the following description and drawings.

DETAILED DESCRIPTION

Figure 1:
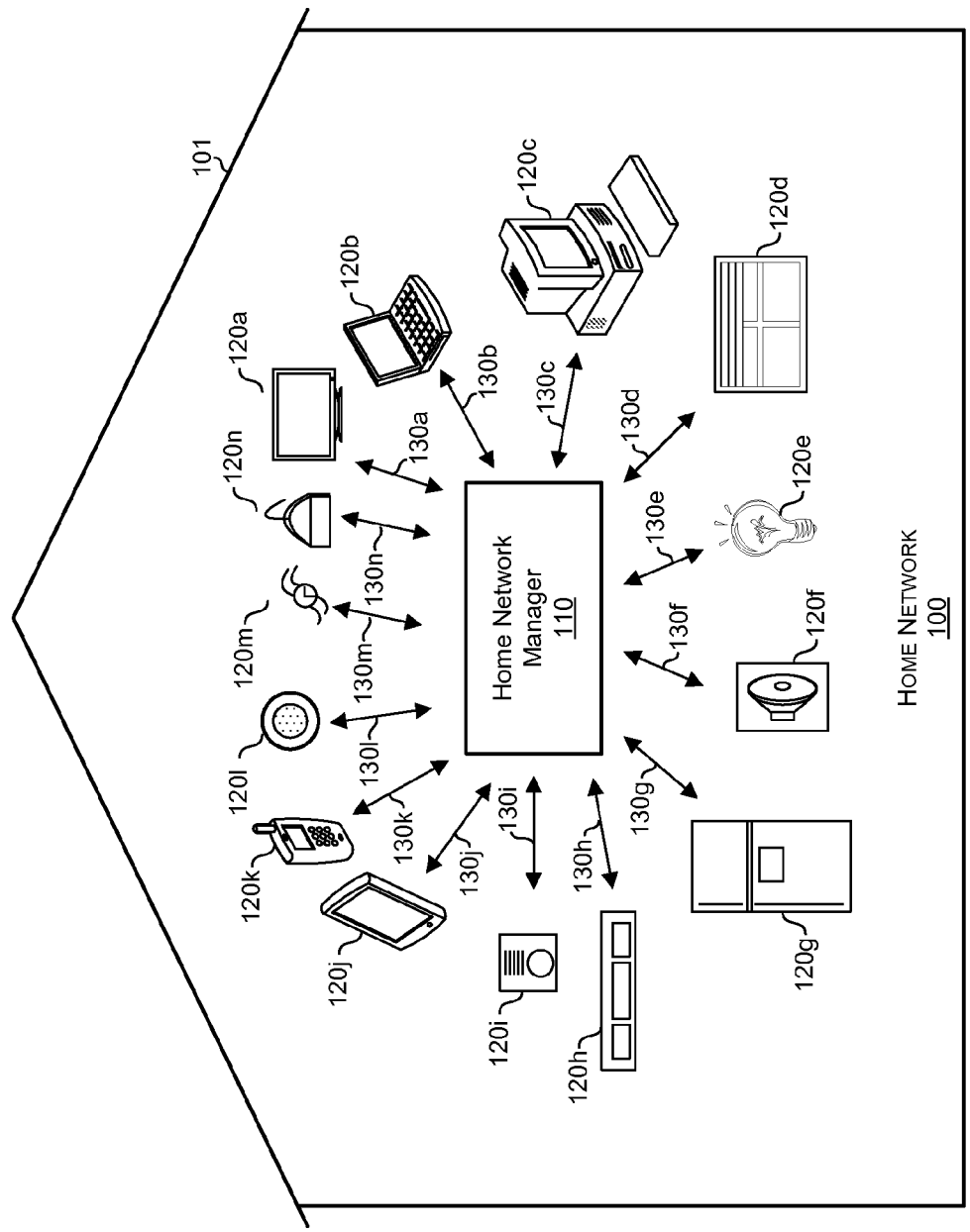
FIG. 1 illustrates an example home network.

Certain implementations may be found in a method and system for an RGBW controller. In one embodiment, the disclosure provides a control system for use in a network. The control system may include an input device coupled to the network to generate an input signal. The control system may also include an RGBW controller having a plurality of input channels and/or a plurality of output channels, and may be coupled to the network. The RGBW may receive the input signal at the input channels, determine if the input signal meets a predetermined condition, and/or generate a series of independent output signals at the plurality of output channels in response to, for example, the input signal meeting a predetermined condition. The control system may also include one or more output devices to receive one or more of the independent output signals, and to perform one or more functions in response to, for example, receiving one or more of the independent output signals.

In another embodiment, the disclosure may provide an RGBW controller. The RGBW controller may include a plurality of input channels to receive one or more inputs. The RGBW controller may also include a processor that may be coupled to the plurality of input channels to determine if, for example, a predetermined condition is met at one or more of the plurality of input channels, and/or in response to a predetermined condition having been met at one or more of the plurality of input channels, to generate one or more output signals. The RGBW controller may also include a plurality of output channels that may be coupled to the processor to independently deliver the one or more output signals.

In another embodiment, the disclosure may provide a method of controlling one or more network devices operable to perform a function in a network via a) an RGBW controller having a plurality of input channels and a plurality of output channels, and/or b) a network manager operable to communicate with the one or more network devices and the RGBW controller. The method may include determining a predetermined condition at one or more of the plurality of input channels, and/or generating a series of independent output signals at the plurality of output channels in response to, for example, determining a predetermined condition has occurred at one or more of the plurality of input channels. The method may also include receiving one or more of the independent output signals at the one or more network devices, and/or performing the function in response to receiving one or more of the independent output signals.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and/or "module" refer to functions than may be performed by one or more circuits. As utilized herein, the term "example" means serving as a non-limiting example, instance, or illustration. As utilized herein, the terms "for example" and "e.g." introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

FIG. 1 illustrates an example home network. Referring to FIG. 1, there is shown a home network 100.

The home network 100 may correspond to a location 101. The location 101 may, for example, correspond to a residence (e.g., home, apartment) or non-residence premises (e.g., small business, school, library, factory, or the like). In this regard, the home network 100 may, for example, comprise a plurality of home network elements, such as, for example, a plurality of home network elements 120a-120n.

The home network elements (e.g., home network elements 120a-120n) may, for example, comprise one or more devices, systems, fixtures, appliances, and/or other circuitry. The home network elements (e.g., home network elements 120a-120n) may comprise, for example, one or more televisions 120a, one or more computers (e.g., laptop computer 120b, desktop computer 120c), one or more personal and/or handheld devices (e.g., tablet 120j, mobile phone 120k, smart watch 120m), one or more multimedia devices and/or components (e.g., speakers 120f), one or more structural fixtures (e.g., windows/window blinds 120d, smart watch), one or more lighting and/or electrical fixtures 120e, one or more appliances (e.g., refrigerator 120g), one or more environmental sensory devices 120h (e.g., thermometers, humidity meters), and/or one or more security devices 120i (e.g., a smoke detector, a carbon monoxide detector, a security alarm, a motion detector) one or more sensors and/or controllers (e.g., intelligent motion sensor 1201, RGBW controller 120n) and/or other devices.

The disclosure is not limited to any particular type of a home network. Furthermore, the disclosure is not limited to any particular combination of home network elements. It is to be understood that although the network is referred to as a "home network" throughout the disclosure, the disclosure is not limited in this way. Specifically, the network may comprise any other network that may be operable to control one or more network elements. For example, the network of the disclosure (whether or not referred to as a "home network") may be implemented in a residential, non-residential, commercial, industrial and/or any other setting. Similarly, the network elements may comprise network elements (whether or not referred to as a "home network elements") implemented in a residential, non-residential, commercial, industrial and/or any other setting.

In some instances, the home network 100 may incorporate a home network manager 110. The home network manager 110 may comprise suitable circuitry, interfaces, logic, and/or code for implementing various aspects of the present disclosure. For example, the home network manager 110 may be configured for use in managing, servicing, and/or interacting with one or more home network elements. Although the home network manager 110 is shown in FIG. 1 as a single and separate device, the disclosure is not limited in this way. For example, in some implementations, one or more functions of the home network manager 110 may be provided by one or more home network elements (e.g., providing user interface via tablet 120j and/or television 120a). In an example embodiment of the disclosure, the home network manager 110 may be implemented as a virtual platform, such as, for example, one or more software modules may run on, and/or utilize resources of one or more home network elements (e.g., laptop 120b, desktop 120c).

The home network manager 110 may be configured to communicate with one or more elements (e.g., home network devices, home network elements) in a home network. In an example embodiment of the disclosure, the home network manager 110 may be operable to communicate with one or more devices and/or systems that may be external to a home network, using, for example, optical, wired and/or wireless communication links.

Although the home network manager 110 is illustrated as a single device, the disclosure is not limited in this way. For example, the home network manager may comprise one or more home network manager that may each interact with one or more home network elements (e.g., home network elements 120a-120n). In an example embodiment of the disclosure, each of the one or more home network managers may be associated with particular one or more home network elements. In another example, one or more of the one or more home network managers may be associated with any one or more home network elements (e.g., home network elements within range of a particular home network manager, with best communication path).

In an example embodiment of the disclosure, the home network manager 110 may be implemented in an integrated or a distributed system. An integrated system may be implemented, for example, on one computer, server, machine or device, where the integrated system may be configured to perform some or all of the functions, features and/or operations of the home network manager 110 as described herein. A distributed system may be implemented with multiple components (e.g., computers, servers, machines and/or devices), where each of the multiple components may be configured to perform some or all of the functions, features and/or operations of the home network manager 110 as described herein. Each function, feature and/or operation may be implemented on one or more of the components of the distributed system. For example, a specific feature, function and/or operation may be implemented only one component of the distributed system or it may be implemented across multiple components of the distributed system.

In an example embodiment of the disclosure, in addition to or instead of the use of one or more home network managers, the home network 100 may comprise one or more master controllers for controlling one or more home network elements. A master controller may be pre-programmed and/or programmable to control one or more home network elements. A master controller may comprise, for example, a remote controller.

Although the disclosure may refer to a single home network manager, it is to be understood that the disclosure is not limited in this way. For example, the home network manager may comprise one or more home network managers that individually and/or in the aggregate may be implemented as integrated and/or a distributed system.

The home network manager 110 may interact with one or more of the home network elements 120a-120n via corresponding links 130a-130n, which may be supported by the home network manager 110 and/or the corresponding home network element(s). For example, the links 130a-130n may be implemented and/or configured to operate using a wireless protocol, such as, for example, a Z-wave protocol. In an example embodiment of the disclosure, the home network 100 may be implemented as Z-Wave network. However, the disclosure is not limited in this way. For example, the home network 110 may comprise one or more wired and/or wireless links and/or protocol. Wireless links and/or protocols, may comprise, for example, WPAN (e.g., Bluetooth or ZigBee), low power links (e.g., Bluetooth LE (BLE), Bluetooth Smart, iBeacon), near field communication protocols (e.g., NFC) and/or WLAN (WiFi/802.11) protocols and/or any other wireless links and/or protocols suitable for implementation consistent with the disclosure. Wired protocols and/or links may comprise, for example, Ethernet, Universal Serial Bus (USB), and/or any other wired links and/or protocols suitable for implementation consistent with the disclosure.

In an example embodiment of the disclosure, home network manager 110 may interact with one or more home network elements (e.g., home network elements) directly and/or indirectly. For example, the home network manager 110 may interact with one or more home network elements directly through a corresponding link (e.g., wireless, wired link/connection).

In another example, the home network manager 110 may interact with one or more home network elements indirectly though, for example, a converter (e.g., global cache.) In this regard, the home network manager 110 that supports one or more particular network interfaces and/or other interfaces (e.g., USB) may be operable to interact with a particular network element (and/or another device) that may otherwise be incompatible with one or more of the one or more particular network and/or other interfaces supported by the home network manger 110. The interaction may be achieved though, for example, a converter and/or a translator. The converter and/or the translator may each comprise suitable logic, circuitry, interfaces, and/or code that may be operable to facilitate communication between a home network manager (e.g., the home network manger 110) and a home network element (home network elements 120a-120n).

In another example, the home network manager 110 may interact with one or more home network elements indirectly though, for example, other network elements. In this regard, the home network manager 110 may interact with one or more home network elements on, for example, a mesh network. An example mesh network (not shown) may facilitate communication (e.g., transmission of messages, signals, data frames) to and/or from the home network manager (e.g., the home network manager 110) to and/or from a particular network element where the communication may, for example, pass through one or more other network elements before reaching the particular network element and/or the home network manager.

In an example embodiment of the disclosure, the home network manager 110 may be operable to support one or more communication methods from one or more other home network devices (e.g., home network elements 120a-120n). For example, one or more home network elements may communicate with the home network manager 110 utilizing a particular wireless link and/or protocol (e.g., Z-wave) and/or a particular wired link and/or protocol (e.g., Ethernet), while one or more other home network elements may communicate with the home network manager 110 utilizing a different particular wireless link and/or protocol (e.g., WiFi) and/or a different particular wired link and/or protocol (e.g., USB).

In an example embodiment of the disclosure, the same one or more home network elements may communicate with the home network manager 110 by, for example, using one or more wired and/or wireless links and/or protocols at the same and/or at different times. For example, a particular network element may communicate with the home network manager 110 using a Z-Wave communication protocol for a particular communication and may communicate with the home network manager 110 using a WiFi communication protocol for another particular communication.

In an example embodiment of the disclosure, one or more home network elements (e.g., home network elements 120a-120n) may communicate with one or more home network elements (e.g., home network elements 120a-120n) directly. In this regard, the one or more network elements may utilize one or more communication links (e.g., wireless, wired) (not shown) and/or one or more network interfaces and/or other interfaces without directing (e.g., routing the communication thought, for example, a home network manager (e.g., the home network manger 110). For example, a home network element may be operable to detect existence of one or more other network elements (e.g., on the same and/or different network) and may initiate, send and/or receive communication to and/or from the one or more other network elements.

In an example embodiment of the disclosure, one network element may be out of range of a home network manager and may communicate with one or more other network elements to determine whether the one or more other network elements are within range of a particular (e.g., a home network manager previously within range of the one network element) and/or any network manager. The range detection and/or discovery may continue from one network element to another. For example, a particular home network element may need to communicate through more than one other home network element in order to, for example, communicate with a desired home network element and/or a desired, particular and/or any home network manager (e.g., the home network manager 110). The disclosure is not limited to a communication for a purpose of range discovery/detection. The communication may comprise any type of communication and may be used for a variety of other purposes (e.g., communicating with a different network element, communicating with a home network manager, controlling an out of range device, controlling another network element).

In an example embodiment of the disclosure, one or more home network elements (e.g., home networks elements 120a-120n) may be operable to control one or more other home network elements (e.g., home networks elements 120a-120n) with and/or without intermediary, such as, for example, a home network manager (e.g., home network manager). For example, one or more home network elements may be operable to control one or more other home network elements through an intermediary. In this regard, a particular network element may communicate with an intermediary (e.g., home network manager) in order to communicate with and/or to control another home networks element. An intermediary may comprise one or more devices (e.g., a preprogrammed and/or programmable master controller, home network manager) that may be operable to control one or more network elements. In another example, a particular network element may directly communicate with and/or to control another home network element.

In an example embodiment of the disclosure, one or more home network elements (e.g. home network elements 120a-120n) and/or other devices that may be operable to communicate on the network (and/or an associated network as described herewith) and/or that may not be operable to communicate on the network but may otherwise be tractable (e.g., GPS, iBeacon, electronic tag), with one or more other network elements, devices and/or a network manager (e.g., home network manager 110) associated with a particular network (e.g., home network 100) (and/or an associated network as described herewith), may communicate with each other, other devices (e.g., on the same network, another network and/or otherwise connected and/or tractable) and/or the network manager, and/or may be operable to determine a precise location of a particular network element, device and/or network manager utilizing various communication protocols and/or interfaces.

For example, one or more network elements (and/or other devices operable on the network, an associated network as described herewith and/or otherwise traceable) may be operable to generate and/or receive information and/or one more signals and/or messages that may be utilized in determining a location of a particular network element, device and/or network manager. In this regard, a near field communication and/or a low power interface protocol (e.g., BLE, iBeacon)

may be utilized for communication between the elements, devices and/or network managers. Furthermore, one more tags (e.g., small electronic devices) may be utilized, to facilitate location of particular elements, devices and/or network managers. For example, a network element, device and/or home network manager may generate a signal and/or a message (on the network, on an associated network and/or through a built in, external, portable and/or otherwise attachable tag) that may be received by another network element, device and/or network manager.

In an example embodiment of the disclosure, one or more home network elements, devices and/or manager may cooperate (e.g., exchange information) to, for example, collectively and/or individually determine a precise location of a particular network elements, device and/or network manager based on the received one or more signals and/or messages. As an example only, a particular network element, device and/or home network manager may generate a signal and/or a message that may be received by other network element, device and/or home network device within a particular time frame. The information about the time it took to, for example, receive the particular one or more signals and/or messages (and/or the information gather from the one or more signals and/or messages, such as, for example, signal strength) may be used to determine the precise location (e.g., distance to/from the network element, device, network manager that received the particular one or more signals and/or message) of the particular network element, device and/or network manager.

In operation, the home network manager 110 may be operable to manage a home network (e.g., the home network 100). The home network manager 110 may be utilized, for example, as an interface platform for interacting with various network elements (e.g., the home network elements 120a-120n). In this regard, the home network manager 110 may support establishing and/or configuring one or more communication connections/links (e.g., the links 130a-130n) with the one or more elements of the home network 110. Once established, the connectivity between the home network manager 110 and the home network elements (e.g., elements 120a-120n) may, for example, be utilized to enable centralized monitoring, control, and/or management of the home network elements, and/or of the home network 100 as a whole. For example, the home network manager 110 may be operable to control operations of certain elements (e.g., turn on television 120a, switch to particular channel(s) at particular days/times, and/or record if recording is supported); monitor environment in the home network, such as by obtaining environmental readings (e.g., temperature, humidity, etc.) via example environmental sensory devices 120h, and may process these readings (e.g., to determine if/when to adjust other home network elements accordingly); adjust one or more example lighting and/or electrical fixtures 120e (e.g., turn lights on or off); lower/raise example window (blinds) 120d; adjust operations of example appliances (e.g., refrigerator 120g), such as, for example, based on a preconfigured power efficiency/optimization profile; monitor for any indications of a security/safety problem, based on, for example, input from example security devices 120i, and/or act accordingly (e.g., send notifications to users, such as by texting example smartphone 120k, and/or automatically notify authorities, e.g., by dialing '911' and/or contacting preconfigured emergency numbers).

In an example embodiment of the disclosure, the home network manager 110 may provide and/or utilize user interface services in the home network. In this regard, the home network manager 110 may be operable to support use of user interface functions, and/or to generate and/or store information corresponding thereto, which may be utilized to enable interactions between the home network manager 110 and users (e.g., in the home network 100). For example, in some implementations, the home network manager 110 may be configured to generate and/or use a graphic user interface (GUI), for visually displaying information and/or providing interactivity with users (e.g., for providing input thereby). One or more user interfaces may enable configuring the home network manager 110 and/or functions provided by the home network manager 110. In an example embodiment of the disclosure, the one or more user interfaces may enable user interaction with, configuring and/or adjusting other elements in the home network 100 (e.g., elements connected to the home network manager 110).

In an example embodiment of the disclosure, the user interfaces may be provided via one or more other devices that may be communicatively coupled to the home network manager 110. For example, a GUI generated and/or used by the home network manager 110 may be displayed using existing home network elements, such as, for example, television 120a, laptop 120b, tablet 120j, and/or smartphone 120k.

In an example embodiment of the disclosure, one or more home network elements (e.g., home network elements 120a-120n) may be configured to provide enhanced functionality, especially in the context of the home network provided by home network managers (e.g., the home network manager 110). For example, rather than utilizing a typical controller, a RGBW controller may be utilized, such as to provide enhanced LED, RGB or RGBW strips, lighting and fan control functions, device interface functions and/or other functions in a home network (e.g., the home network 100). An example RGBW controller is depicted in and/or described with respect to FIG. 2.

The disclosure is not limited to a single network (e.g., home network 100) and/or a single network manager (e.g., home network manager 110). For example, one or more networks (e.g., home network 100) and/or one or more network managers (e.g., home network manager 110) may be grouped together. The grouping may correspond to one or more locations (e.g., location 101).

In an example embodiment of the disclosure, a network (e.g., home network 100) may be associated with one or more network managers (e.g., home network manager 110). For example, one network manager may be associated with one or more networks (e.g., home network 100) and/or locations (e.g., location 101), In an example embodiment of the disclosure, a grouping of networks may comprise one or more network, network managers and/or locations. The grouping may be programmable and/or configurable. For example, one more networks may be defined, one or more network managers may be assigned per network and/or associated with one or more devices with a network and/or a network manager. In this regard, the information may be shared between the different networks, network managers and/or devices assigned to the different networks and/or network managers. For example, information gathered on one network (e.g., by a network device, through an occurrence of a condition, event, an alarm, and/or other predefined and/or preconfigured condition) may cause the information to be communicated on the same and/or another associated network. In this regard, the information may trigger a condition, an alarm, an occurrence of an event and/or any other predefined and/or preconfigured condition (e.g., operation of a device, network element) on the same and/or another associated network.

In an example embodiment of the disclosure, one or more home network elements (e.g., home network elements 120a-120n) may be configured to provide enhanced functionality, especially in the context of the home network provided by home network managers (e.g., the home network manager 110). For example, rather than utilizing a typical light controller, an enhanced light controller (e.g., RGBW controller 120n) may be utilized, such as to provide enhanced light functions, device interface functions and/or other functions in a home network (e.g., the home network 100). An example RGBW controller is depicted in and/or described with respect to FIG. 2.

Figure 2:
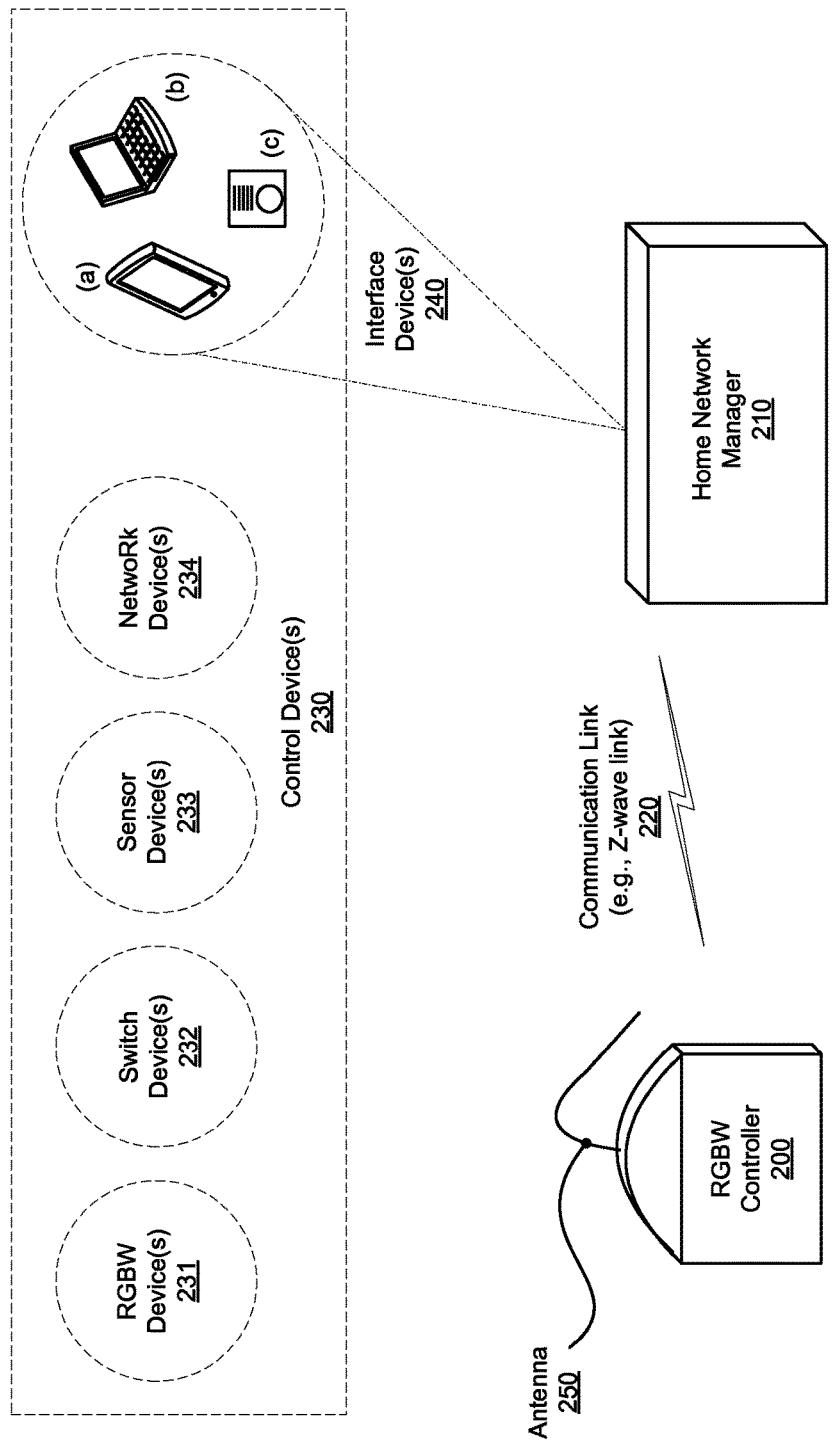
FIG. 2 illustrates an example RGBW controller.

FIG. 2 illustrates an example RGBW controller. Referring to FIG. 2, there is shown an RGBW controller 200.

The RGBW controller 200 may comprise suitable circuitry, interfaces, logic, and/or code for implementing various aspects of the present disclosure. The RGBW controller 200 may be implemented and/or configured to provide enhanced control, monitoring and/or connectivity of one or more RGBW, switch, sensor and/or network devices, such as, for example, one or more control device(s) 230, other device control, monitoring, connectivity, and/or related functions.

A control device 230 may, for example, comprise one or more RGBW devices (e.g., RGBW device(s) 231), one or more switch devices (e.g., switch device(s) 232), one or more sensor devices (e.g., sensor device(s) 233), one or more interface devices (e.g., interface devices 240(a)-(c)) and/or one or more other devices (e.g., home network elements 120a-120n, network device(s) 234).

An RGBW device 231 may, for example, comprise a device that may be controlled and/or monitored by the RGBW controller 200 consistent with the disclosure. Although the disclosure refers to an RGBW device, the disclosure is not limited in this way. For example, an RGBW device 231 may comprise one or more LED, RGB or RGBW lights, color channels (e.g., individually and/or collectively) and/or strips, halogen lights, fans and/or other devices that may be controlled and/or monitored by and/or connected to an RGBW controller, such as, for example, the RGBW controller 200.

A switch device 232 may, for example, comprise a momentary switch, a toggle switch and/or any other switch.

A sensor device 233 may, for example, comprise a device that may be monitored by, for example, detection of varying output levels (e.g., varying voltage levels, for example, between 0V and 10V).

A sensor device 233 may, for example, comprise a temperature sensor, humidity sensor, pressure sensor (e.g., air, water, glycol, oil), differential fluid pressure sensor, photoelectric sensor, air flow sensor (e.g., air flow duct sensor), air quality sensor, air velocity sensor (e.g., HVAC air velocity sensor), pH sensor, CO sensor, CO2 sensor, wind sensor, light sensor, rain sensor, distance sensor, hydrostatic sensor, ultrasonic sensor, ultrasonic distance sensor, load sensor, tonometer, color sensor, and/or any other sensor and/or device (e.g., encoder for encoding output from a sensory device) that may be operable to generate one or more output levels and/or ranges that may be detected by an RGBW controller 200.

A network device 234 may, for example, comprise a network device that may be similar to a home network element, such as, for example home network element(s) 120a-120n, other devices (e.g., intelligent wall plug, roller shutter, door/window controller, RGBW controller, flood sensor, dimmer) and/or a network manager (e.g., home network manger 210).

The RGBW controller 200 may be utilized to control the operation of one or more control devices (e.g., control device(s) 230). In this regard, the RGBW controller 200 may comprise one or more input and/or output terminals (not shown) for controlling one or more devices and/or for receiving input from one or more devices.

An input and/or output port may comprise suitable circuitry, interfaces, logic, and/or code for providing input and/or output to and/or from the RGBW controller (e.g., the RGBW controller 200). In this regard, an input and/or output port of an RGBW controller (e.g., RGBW controller 200) may be configurable as an input port, an output port and/or a hybrid input/output port (e.g., output port with feedback). In an example embodiment of the disclosure, one or more input and/or output ports may be pre-configured as input, output or hybrid input/output ports. In another example embodiment of the disclosure, an input and/or output port may be configured and/or reconfigured (e.g., from a preconfigured or default configuration) as input, output or hybrid input/output port through, for example, a user interface. The user interface may be, for example, provided directly through the RGBW controller 200 (e.g., interface of the RGBW controller) and/or through another device (e.g., home network manager 210, interface device(s) 240a-c).

An input port may be configurable to provide input to the RGBW controller 200 from, for example, other devices (e.g., control device(s) 230). For example, the RGBW controller 200 may receive input, through an input port, from, for example, one or more RGBW device(s) 231, switch device(s) 232, sensor device(s) 233, network device(s) 234 and/or interface device(s) 240a-c.

An output port may be configured to provide output from the RGBW controller 200 to, for example, other devices (e.g., control device(s) 230). For example, the RGBW controller 200 may provide output, through an output port, to, for example, one or more RGBW device(s) 231, switch device(s) 232, sensor device(s) 233, network device(s) 234 and/or interface device(s) 240a-c.

In an example embodiment of the disclosure, the RGBW controller 200 may provide output to other devices through, for example, an output port in response to, for example, an occurrence of a predefined and/or a preconfigured condition.

A predefined and/or a preconfigured condition may comprise, for example, time of the day, day of the week, alarm condition and/or any other condition. For example, the RGBW controller 200 may provide output to and/or control the RGBW strip (e.g., turning on, off, adjusting the Red, Green, Red and/or White light channels) and/or any other device at a particular time of the day.

In an example embodiment of the disclosure, the RGBW controller 200 may control other devices in response to, for example, an input on one or more input ports. For example, the RGBW controller 200 may control an RGBW strip in response to, a change on one or more input ports. For example, the RGBW controller 200 may provide output to and/or control the RGBW strip (e.g., turning on, off, adjusting the Red, Green, Red and/or White light channels) and/or any other device in response to an activation or deactivation of a switch (e.g., switch device(s) 232).

In another example, the RGBW controller 200 may provide output to and/or control the RGBW strip (e.g., turning on, off, adjusting the Red, Green, Red and/or White light channels) and/or any other device in response to an input (or a predefined and/or preconfigured input level) from a sensory device (e.g., sensory device(s) 233).

In an example embodiment of the disclosure, the RGBW controller 200 may control other devices in response to, for example, a command from a network manager (e.g., home network manager 210) and/or another device and/or network device (e.g., network elements 120a-120n, interface device (s) 240). For example, the network manager and/or another device may send a command to the RGBW controller 200 in response to a predefined and/or preconfigured condition (e.g., smoke detected, garage door opened) and/or in response to user input (e.g., turning devices controlled by the RGBW controller on or off, adjusting color combinations of an LED, RGB and/or RGBW strip).

In an example embodiment of the disclosure, the RGBW controller 200 may control other devices in response to, for example, a change in state on one or more input and/or output ports of the RGBW controller 200. In this regard, one or more output and/or hybrid input/output ports may be configurable to provide output to another device on the output port and/or the hybrid input/output port in response to a change in state on one or more other input and/or output ports. For example, one or more input, output and/or hybrid input/output ports may be associated with one or more other input, output and/or hybrid input/output ports.

In an example embodiment of the disclosure, an input port, such as, for example, a port connected to a temperature sensor, may be associated with an output port, such as, for example, an output port connected to an RGBW strip (or one particular channel of the RGBW strip). In this regard, a change on the input port (e.g., drop in temperature below a predefined and/or preconfigured level) may trigger output on the output port (e.g., turning on, off, adjusting light channels of the RGBW strip to, for example, match the color of the RGBW strip to the temperature).

The disclosure is not limited to any particular combination of input, output and/or hybrid input/output ports. For example, the combinations may include one-to-one combinations and/or many-to-many combinations and/or cross combinations (e.g., the same port may associated with one or more combinations). Furthermore, the combinations may be based on any number of inputs (e.g., alarm conditions sensory readings, commands from other devices and/or network devices).

In an example embodiment of the disclosure, one input, output and/or hybrid input/output port may be associated with one or more devices. For example, one port may receive input and/or provide feedback and/or output to and/or from one or more devices.

In an example embodiment of the disclosure, an input and/or output port of the RGBW controller 200 may be associated with one control device (e.g., control device(s) 230). In another example embodiment of the disclosure, an input and/or output port of the RGBW controller 200 may be associated with one or more control devices (e.g., control device(s) 230). For example, one or more control devices may be grouped and may be monitored and/or controlled simultaneously, systematically, sequentially and/or through a predefined and/or preconfigured relationship between the one or more control devices by, for example, one or more RGBW controllers (e.g., RGBW controller 200). Although the disclosure may refer to one RGBW controller when describing control of one or more control devices, the disclosure is not limited in this way. It is to be understood that various combinations of one or more RGBW controllers and one or more control devices may be implemented.

In an example embodiment of the disclosure, one RGBW controller (e.g., RGBW controller 200) may communicate with one or more other network devices (e.g., another RGBW controller, network device(s) 234) in order to initiate control of one or more control devices (e.g., control device (s) 230) that may be directly and/or indirectly controlled by the one or more other network devices (e.g., another RGBW controller, network device(s) 234). The communication may be direct and/or indirect. For example, the communication may be directly between the one RGBW controller and one or more network devices. In this regard, an intermediary may or may not be involved in an initial configuration of the communication between the one RGBW controller and one or more network devices. In another example, the communication may be indirect through, for example, an intermediary (e.g., network element, RGBW controller, shutter device, home network manager, master controller).

In an example embodiment of the disclosure, operation of a RGBW controller may trigger operation of another network device (e.g., another RGBW controller, network device(s) 234). For example, a command received by a particular RGBW controller to, for example, monitor and/or control one or more control devices (e.g., turn RGBW strip on/off) may trigger operation of one or more other control devices (e.g., control device(s) 230), such that, for example, the one or more other network devices (e.g., another RGBW controller, network device(s) 234) may operate one or more other control devices (e.g., control device(s) 230) that may be associated with the one or more network devices (e.g., turning another RGBW strip on/off, turning light on/off in a room).

The RGBW controller 200 may, for example, be operable in one or more modes. For example, the RGBW controller 200 may operate in an RGB/RGBW mode, an IN/OUT mode and/or any other mode. A mode of operation of the RGBW controller 200 may comprise, for example, one or more features of the RGB/RGBW mode, the IN/OUT mode and/or any other feature of the RGBW controller 200.

In the RGB/RGBW mode, the RGBW controller 200 may be operable to control an RGBW device (e.g., RGBW devices) 231). In an example embodiment of the disclosure, the RGBW controller 200 may control a particular input and/or output port independently from another input and/or output port. For example, the RGBW controller 200 when, for example, controlling an RGBW device (e.g., RGBW device(s) 231)), such as, for example, an RGBW strip may control each of the R, G, B and/or W channels independently of any other channel. In this regard, the RGBW controller 200 may allow for adjusting saturation of each color (e.g., through the assigned channel) independently.

In another example embodiment of the disclosure, the RGBW controller 200 when, for example, controlling an RGBW device (e.g., RGBW device(s) 231)), such as, for example, RGBW strip may control all of the one or more input and or output ports together to the same extent. For example, an operation of a switch (e.g., input to the RGBW controller 200) may control brightness of all outputs of an RGBW controller 200 (e.g., all R, G, B, and W channels) at the same time.

In another example embodiment of the disclosure, the RGBW controller 200 when, for example, controlling an RGBW device (e.g., RGBW device(s) 231)), such as, for example, RGBW strip may control one or more input and or output ports together to a different relative extent. For example, an operation of a momentary switch (e.g., input to the RGBW controller 200) may be utilized to achieve a rainbow effect (e.g., changing colors of an LED, RGB and/or RGBW strip between the full spectrum of colors).

The RGB/RGBW mode is not limited to monitoring and/or controlling RGB or RGBW devices. For example, the RGB/RGBW mode may be configurable to monitor and/or control other strips and/or can lights (e.g., LED), and/or other light sources.

In an example embodiment of the disclosure, the RGBW controller may be operable as a transformer or a converter for particular light sources. For example, the RGBW controller 200 may monitor and/or control light sources that may operate on either AC or DC current by providing appropriate transformation or conversion (e.g., the RGBW controller may monitor and/or operate the light sources directly without a need to implement an additional transformer or converted between the light source and one or more input and/or output ports of the RGBW controller).

In an IN/OUT mode, the RGBW controller 200 may be operable to allow for custom configuration of one or more input, output and/or hybrid input/output ports. The custom configuration (e.g., by a user) may comprise association of ports (as described herein), selection of inputs (e.g., switch, sensor) and/or specification of outputs (e.g., desired outputs, conditions for triggering the desired outputs).

Although the disclosure describes the RGB/RGBW and the IN/OUT modes of operation of an RGBW controller (e.g., RGBW controller 200), the disclosure is not limited in this way. For example, an RGBW controller may be operable in an RGB/RGBW, IN/OUT mode and/or any other mode that may combine one or more aspects of the RGB/RGBW, IN/OUT and/or any features and/or modes of operations of an RGBW controller.

In an example embodiment of the disclosure, the RGBW controller 200 may, for example, adjust particular (e.g., based on preconfigured and/or preprogrammed settings) lighting fixtures automatically. In this regard, the RGBW controller 200 may be operable to adjust illumination, switch on/off and/or dim an illumination source. In another embodiment, the RGBW controller 200 may initiate running of a scene based on the change of a state of a particular control device (e.g., on an input and/or hybrid input/output port). For example, the RGBW controller 200 may run, for example, a "Cold Evening" scene when it detect that a user has returned home (e.g., input from a motion sensor) during evening (e.g., input from a timer, clock, other network device, device manager) and the temperature is below a predefined and/or pre-configured level (e.g., input from an outside temperature sensor). The RGBW controller 200 may also, for example, adjust other devices when a particular scene is triggered (e.g., light up a fire place, turn on relaxing music).

In an example embodiment of the disclosure, the scene may be, for example, triggered by various inputs on one or more input and/or output ports (e.g., input ports, hybrid input/output ports) and/or by a command received by the RGBW controller 200 from, for example, a network manager (e.g., home network manager 210) and/or from another device and/or a network device (e.g., network elements 120a-120n, interface device(s) 240).

The conditions for running a scene may also include, for example, time of the day, day of the week, lighting conditions, input from sensory devices (e.g., sensory device(s) 233), input from a switch (e.g., switch devices 222) conditions based on location services, such as, for example, based on presence of a particular mobile device within the vicinity of a predefined and/or preconfigured location, etc. A scene may comprise a variety of sequential and/or simultaneous events that may operate and/or adjust settings of any network element, including elements directly connected to the network (e.g., home network 100) through a home network manager, elements connected through other network elements and/or devices (e.g., control devices connected through a RGBW controller), and/or otherwise connected to the network and/or operable to be controlled through the network and/or one or more elements and/or devices on the network.

In an example embodiment of the disclosure, the scene may comprise lighting scene (e.g., monitoring and/or controlling lighting condition) and/or other scenes (e.g., controlling other devices to enhance a scene).

In operation, the RGBW controller 200 may be operable as a network extension. For example, the RGBW controller 200 may be connected to another input device (e.g., switch device(s) 232), such as, for example, a wall switch, toggle switch, momentary switch and/or another network device (e.g., network device(s) 234, home network elements 120a-120n). In this regard, the RGBW controller 200 may be operational to control virtually any device without the need to run additional wires and/or within a need to provide particular support for the device on the network (e.g., home network 100).

In an example embodiment of the disclosure, the RGBW controller 200 may be connected to a wall switch (or any other switch) that may or may not be otherwise connected to any other device. In this regard, the RGBW controller 200 may act as a wireless entry point. For example, toggling the switch may be configured (through, for example, a network manager) to perform any sequence of events (simultaneously, in sequence, separated by a predefined period of time) on the network. For example, toggling the switch connected to an RGBW controller 200 may activate operation of any other device on the network. For example, toggling the switch may activate a lighting scheme, etc.

In an example embodiment of the disclosure, toggling a switch that may be, for example, associated with a scene, may tiger a scene that may be initiated by an RGBW controller 200. For example, activating the switch, may cause the RGBW controller 200 to activate a "Relax" scene and may adjust temperature, humidity, music volume, lights and/or other features that may be associated with control devices based on, for example, input from sensory devices.

In another example embodiment of the disclosure, the RGBW controller 200 may operate in connection with an RFID reads (e.g., distance sensors) to activate a scene.

In another example embodiment of the disclosure, the RGBW controller 200 may activate a scene based on an input on one or more input and/or hybrid input/output ports. In yet another example embodiment, the RGBW controller 200 may activate a scene based on a command received over the network from another network device (e.g., network elements 120a-n, interface device(s) 240) and/or a network manager (e.g., home network manager 210).

In an example embodiment of the disclosure, a scene may be triggered via an input other than from a switch. For example, a scene may be activated by a change in state of a sensor device, such as, for example, a motion sensor. For example, when motion is detected on the back porch as scene associated with such an even may be activated.

In another example embodiment of the disclosure, the RGBW controller 200 may be operable to activate one or more scenes based on a sequential input. For example, an RGBW controller 200 may be connected to a switch. In this regard, the RGBW controller 200 may activate a particular scene based on, for example, a number of sequential clicks). For example, click once for a "Movie Scene" (e.g., dimming lights, adjusting background settings, home theater settings), click twice for a "Dinner Scene" (e.g., turn on light over a dinner table, turn off TVs), etc.

The disclosure is not limited to any type of devices that the RGBW controller 200 may control. Furthermore, the disclosure is not limited to any particular scene or sequence of events that may be activated and/or initiated by operation and/or functionality of the RGBW controller 200. It is to be understood that the type of devices to be controlled, the setting on the devices and/or any scenes may be preprogrammed, preconfigured and/or otherwise customized based on the desired outcome.

In an example embodiment of the disclosure, operation of an RGBW controller (e.g., RGBW controller 200) may trigger operation of another network device (e.g., network device 120a-120n) or a network manager (e.g., home network manager 210). For example, when an RGBW controller detects a state change of a monitored control device (e.g., control device(s) 230), operation of one or more other network devices (e.g., network device 120a-120n) and/or one or more network managers (e.g., home network manager 210) may be triggered, such that, for example, the one or more network devices and/or one or more network managers may operate one or more devices that may be associated with the one or more network devices and/or the one or more network managers (e.g., when the gate is opened, the lights on the front and/or back porch turn on, a message is generated by a network manager, such as, for example, a text message comprising an alert that a front gate is now open).

The RGBW controller 200 may comprise one or more buttons (and/or other interfaces) (not shown) either inside or outside of the RGBW controller 200 for providing basic functionality to the RGBW controller 200. For example, the RGBW controller 200 may comprise one or more buttons that may be pressed and/or depressed sequentially and/or for a predetermined and/or preconfigured about of time to operate one or more functions of the RGBW controller 200. One or more functions of the RGBW controller 200 may comprise range testing (e.g., whether the RGBW controller is within a home network), connecting to a home network (e.g., paring between an RGBW controller and a home network through, for example, a network manager) and/or tamper prevention.

In an example embodiment of the disclosure the one or more buttons may be located inside of the RGBW controller 200, such that, for example, when the RGBW controller 200 is tampered with (e.g., casing is opened) the button may, for example, become depressed. In this regard, the RGBW controller 200 may generate a tamper alarm condition. The condition may be communicated on the home network (e.g., home network 100), to other devices and/or a home network manager (e.g., home network manager 210).

The RGBW controller 200 may comprise one or more visual and/or audible indicators (e.g., LED(s), speaker(s), and/or other interfaces) (not shown) either inside or outside of the RGBW controller. The one or more visual and/or audible indicators may be used in connection with, for example, providing visual and/or audible cues indicative of, for example, the status of the RGBW controller 200 (e.g., within home network range, connected to a home network, in paring mode) and/or operation the one or more buttons.

The RGBW controller 200 may be configured for operation on a home network (e.g., home network 100 as depicted in and/or described with respect to FIG. 1), such that, the RGBW controller 200 may be utilized as a home network element. In this regard, the RGBW controller 200 may be configured to interact, for example, in a home network (e.g., home network 100 as depicted in and/or described with respect to FIG. 1) with, for example, a home network manager (e.g., home network manager 210). The home network manager may be substantially similar to the home network manager 110 as depicted in and/or described with respect to FIG. 1.

The RGBW controller 200 may be configured to interact with the home network manager 210 via, for example a communication link 220. The communication link 220 may, for example, comprise a Z-Wave link. The disclosure is not limited to any particular type of a communication link. For example, the RGBW controller 200 may be implemented to support, for example one or more wireless and/or wired links, protocols and/or connections. For example, wireless links, protocols and/or connections, may comprise, for example, WPAN (e.g., Bluetooth or ZigBee) and/or WLAN (WiFi/802.11) protocols and/or any other wireless links, protocols and/or connections suitable for implementation consistent with the disclosure. Wired links, protocols and/or connections may comprise, for example, Ethernet, Universal Serial Bus (USB), and/or any other wired links, protocols and/or connections suitable for implementation consistent with the disclosure. While not shown in FIG. 2, to support communication with other elements or systems, such as the home network manager 210, the RGBW controller 200 may incorporate a communication transceiver (e.g., a Z-Wave transceiver) and/or related processing resources for allowing use of the RGBW controller 200.

In an example embodiment of the disclosure, the RGBW controller 200 may comprise an internal and/or an external antenna (e.g., antenna 250) for communicating with other devices (e.g., devices on the network, network elements 120a-120n, control device(s) 230, home network manager 210).

In an example embodiment of the disclosure, the RGBW controller 200 may provide wired and/or wireless interfaces that may enable one or more network devices to connect to a home network (e.g., home network 100) and/or home network manager (e.g., home network manager 210). For example, if the network manager provides connectivity of various devices to a home network, for example, based on a Z-Wave protocol, the RGBW controller 200 may, for example, contain suitable circuitry, interfaces, logic, and/or code that may enable a particular device that, for example, may not be compatible with the example Z-Wave protocol (and/or any other particular protocol that the network manager supports) to connect to the network manager and/or the home network. For example, the RGBW controller 200 may allow for monitoring of sensor devices (e.g., sensor device(s) 233) that may otherwise be incompatible of being monitored on a particular home network and/or by a particular network manager.

In an example embodiment of the disclosure, the RGBW controller 200 may comprise one or more input/output ("I/O") interfaces. The I/O interface may comprise suitable logic, circuitry, interfaces, and/or code that may be operable to enable user interactions with the RGBW controller 200 through interfaces, such as, for example, interfaces provided by the example interface device(s) 240(*a*)-(*c*). The I/O interface may obtain input from user(s) of the RGBW controller 200 and/or provide output to the user(s). The I/O interface may support various types of inputs and/or outputs, including, for example, video, audio, and/or textual. In this regard, dedicated I/O devices and/or components, external to or integrated within the RGBW controller 200, may be utilized for inputting and/or outputting data during operations of the I/O interface. Exemplary (external or integrated) I/O devices may comprise displays, mice, keyboards, touch-screens, voice input interfaces, and other input/output interfaces or devices.

The example interface device(s) 240a-c may, for example, provide a graphical user interface (GUI) for controlling the operation of one or more RGBW controllers (e.g., RGBW controller 200) and/or controlling and/or monitoring one or more control devices (e.g., control device(s) 230) associated with the one or more of the one or more RGBW controllers.

In an example embodiment of the disclosure, the RGBW controller 200 may be operable to communicate with a network manager (e.g., home network manager 210). The RGBW controller 200 may communicate, to the network manager, information and/or data relating to, for example, status of the RGBW controller 200, one or more RGBW devices (e.g., RGBW device(s) 231), switch devices (e.g., switch devices 232), sensor devices (e.g., sensor device(s) 233) and/or other devices (e.g., other device(s) 234) that may be controlled and/or monitored by and/or connected to the RGBW controller 200. The communications may comprise status information, predefined and/or predetermined conditions and/or any other information that may be relevant to the operation of the RGBW controller 200, one or more RGBW devices, switch devices, sensor devices and/or other devices that may be controller and/or monitored by and/or connected to the RGBW controller 200, the and/or any other information that may be relevant to the operation of a home network. The status and/or predefined and/or predetermined conditions may comprise status and/or alarm conditions associated with operation of one or more RGBW devices (e.g., power consumption by an RGBW, switch devices (e.g., on/off, value changed), sensor devices (e.g., temperature, humidity change), other devices, RGBW controller status (e.g., RGBW controller on/off) and/or any other information.

In an example embodiment of the disclosure, the RGBW controller 200 may also receive communications from the network manager. The communications may, for example, comprise information relating to predefined and/or predetermined conditions and/or information comprising commands that may be executed on the RGBW controller 200 (e.g., activate color scheme by for example, changing illumination of one or more RGBW devices, for example, in response, to an alarm condition).

In an example embodiment of the disclosure, the RGBW controller 200 may incorporate a wireless range tester (not shown) that may be operable to, for example, determine whether the RGBW controller 200 is within a range of a home network manager (e.g., home network manager 210) and/or other network element. In this regard, the RGBW controller 200 may be operable to generate an alarm condition when the RGBW controller 200 is not within a range of any home network manager (e.g., home network manager 210) and/or other network element and/or when the RGBW controller 200 that, for example, was previously within the range of a (e.g., home network manager 210) and/or other network element, is now outside of that range. In an example embodiment of the disclosure, the alarm condition may active one or more alarm indicators to generate an alarm condition by, for example, generating an audible and/or a visual alarm.

In another example embodiment of the disclosure, wireless range tester may indicate whether the RGBW controller 200 is in range, is in an intermediate range and/or is out of range of a home network manager. The in range indication may, for example, be associated with a condition where the RGBW controller 200 may establish a direct connection with a home network manager (e.g., home network manager 210) and whether or not a direct communication is desirable (e.g., the RGBW controller 200 may, for example, communicate with the home network manager utilizing other network elements although a direct communication would be possible). The in an intermediate range condition may, for example, be associated with a condition where the RGBW controller 200 may not establish a direct connection with a home network manager (e.g., the home network manager 210) but may establish an indirect communication with the home network manager (e.g., through other network elements). The out of range indication may, for example be associated with a condition where the RGBW controller 200 may not be able to establish either a direct and/or in direct communication with a home network manager (e.g., the home network manager 210).

In an example embodiment of the disclosure, the RGBW controller 200 may indicate whether the RGBW controller is in range (e.g., direct, indirect) and/or out of range through one or more audio and/or visual indicators. The indicators may be, for example, integrated with and/or external to the RGBW controller 200. For example, the RGBW controller 200 may comprise an external visual indicator (e.g., LED, RGB, RGBW light) that may be operable to display the status of the RGBW controller 200 with respect to the range through different colors and/or illumination schemes. For example, a visual indicator may display a different color depending on the in-range status (e.g., one color may indicate that the RGBW controller 200 is in a direct range, a second color may indicate that the RGBW controller is in indirect range and/or a third color may indicate that the RGBW controller 200 is out of range). In another example, the visual indicator may blink at different frequencies, illuminate without blinking and/or be operable to display different illumination schemes depending on the in-range status of the RGBW controller 200.

In another example embodiment of the disclosure, the RGBW controller 200 may activate other light sources (e.g., connected on one or more output and/or hybrid input/output ports of the RGBW controller 200 and/or other light sources connected on the network).

In an example embodiment of the disclosure, the RGBW controller 200 may comprise other suitable circuitry, interfaces, logic, and/or code for implementing various aspects of the present disclosure. For example, the RGBW controller 200 may comprise a memory and/or a processor.

The memory may store, for example, configuration data, which may comprise parameters and/or code, comprising software and/or firmware. The memory may comprise different memory technologies, including, for example, read-only memory (ROM), electrically erasable programmable ROM (EEPROM), random access memory (RAM), low latency nonvolatile memory, flash memory, solid-state drive (SSD), field-programmable gate array (FPGA), and/or other suitable electronic data storage capable of storing data, code and/or other information.

In an example embodiment of the disclosure, the RGBW controller 200 may be operable to receive software and/or firmware updates. For example, the RGBW controller 200 may receive software and/or firmware updates from a network manager (e.g., the home network manager 210). In an example embodiment of the disclosure the software and/or hardware updates may be received, processed and/or installed automatically and/or manually. For example, the process may be completely automatic (e.g., a network manager may send an update to the RGBW controller and the RGBW controller may process it automatically), and/or semi-automatic (e.g., an update may be initiated by a user through, for example, a network manager, and may, for example, be processed by the RGBW controller automatically).

The processor may comprise suitable circuitry, interfaces, logic, and/or code that may be operable to process data, and/or control and/or manage components, operations and/or functions of the RGBW controller 200, and/or tasks performed therein. In this regard, the processor may configure and/or control operations of various components and/or subsystems of the RGBW controller 200, such as, for example, the memory, the communication subsystem (e.g., for communicating with, for example, the home network manager 210) by utilizing, one or more control signals.

Figure 3:
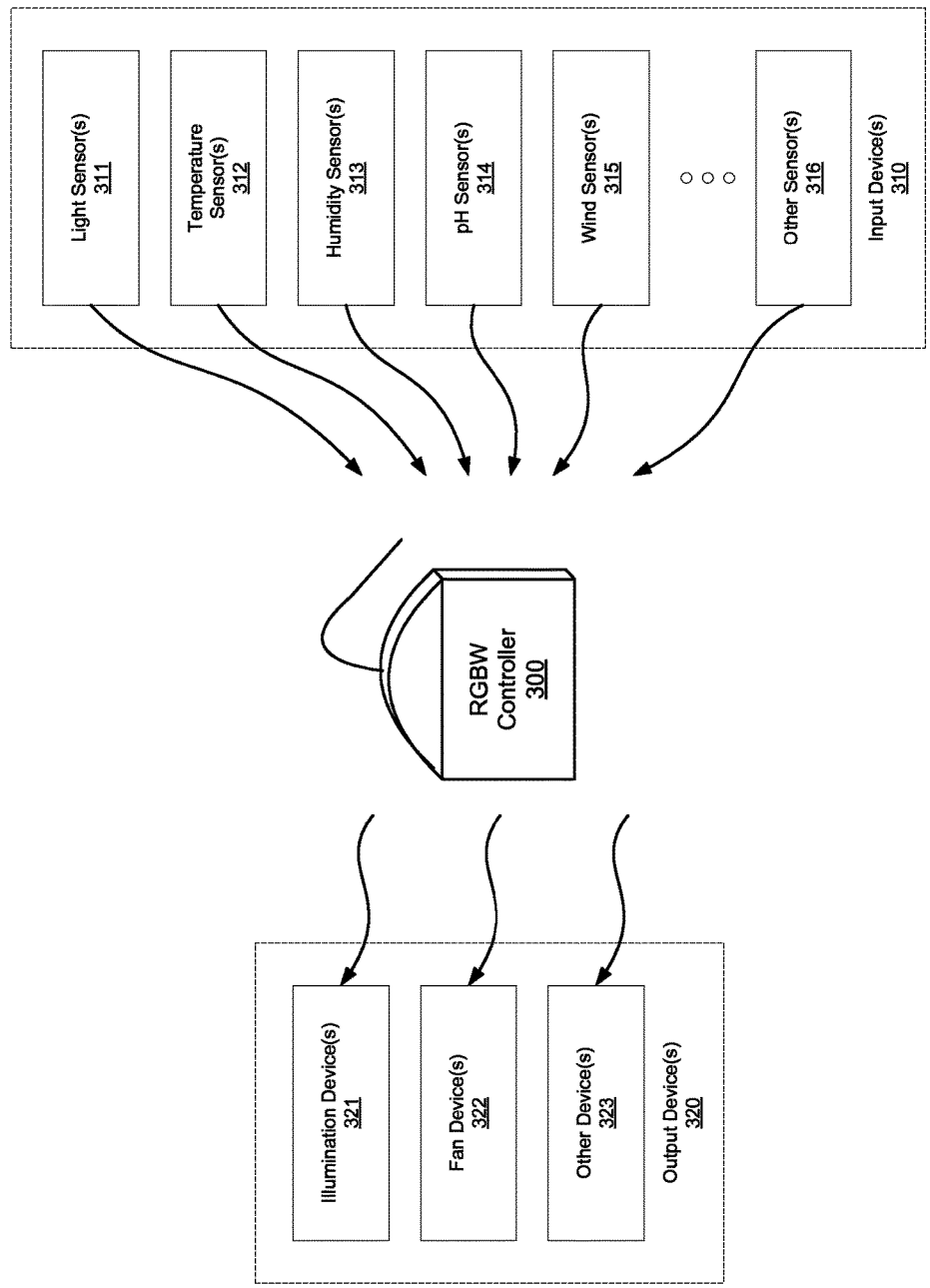
FIG. 3 illustrates example operation of an RGBW controller with example input and/or output devices.

FIG. 3 illustrates example operation of an RGBW controller with example input and/or output devices. Referring to FIG. 3, there is shown an RGBW controller 300, one or more input device(s) 310 and one or more output device(s) 320.

The RGBW controller 300 may be substantially similar to the RGBW controller 200 as depicted in and/or described with respect to FIG. 2.

The one or more input device(s) 310 may each be substantially similar to one or more of the one or more control device(s) 230 as depicted in and/or described with respect to FIG. 2. The one or more input device(s) 310 may, for example, comprise one or more light sensor(s) 311, temperature sensor(s) 312, humidity sensor(s) 313, pH sensor(s) 314, wind sensor(s) 315 and/or any other sensor 316 that may be interoperable with an RGBW controller (e.g., the RGBW controller 300).

The one or more output device(s) 320 may each be substantially similar to one or more of the one or more control device(s) 230 as depicted in and/or described with respect to FIG. 2. The one or more output device(s) 320 may, for example, comprise, one or more illumination device(s) 321, fan device(s) 322 and/or any other device(s) 323 that may be interoperable with an RGBW controller (e.g., the RGBW controller 300).

In an example embodiment of the disclosure, an RGBW controller (e.g., RGBW controller 300) may receive input from an input device (e.g., input devices(s) 310). In this regard, the RGBW controller may be responsive to the input from the input device (e.g., light, temperature, humidity, pH, wind sensor). For example, the RGBW controller may receive input from the input device and may generate a message on a home network (e.g., home network 100) in response to such an input.

The RGBW controller 300 may be configured for providing a wide range of device control options based on configurable trigger conditions, type of input device and/or desired output conditions. Several non-limiting examples are provided below. The present disclosure is not limited to those examples. It is to be understood that the RGBW controller (e.g., RGBW controller 300) may be configured to support other configurations.

As one example, the RGBW controller 300 may receive input from one or more light sensor(s) 311 and may adjust one or more illumination device(s) 321. In this regard, the RGBW controller may match lighting conditions outside with lighting conditions inside. For example, the RGBW controller 300 may dim the lights inside (e.g., illumination device(s) 321) when it is bright outside (light sensor 311). In another example, the RGBW controller 300 may turn lights on automatically when it is getting dark (or turn the lights off when it is getting light outside).

As another example, the RGBW controller 300 may receive input from one or more input device(s) 310 and may adjust one or more output device(s) 320 to alert a user of a particular condition. For example, the RGBW controller 300 may receive input from a temperature sensor 312 and may adjust one or more illumination device(s) 322 to match the color of the one or more illumination devices to the temperature. For example, the RGBW 300 may control illumination of light in a bathtub to match the temperature of the water.

The RGBW controller 300 may adjust the lighting in the room (e.g., change all illumination source to a red color) when and alarm condition is detected (e.g., a smoke or fire message received from one or more sensor devices and/or other devices on the network).

In another example, the RGBW controller 300 may receive input from, for example, one or more temperature sensor(s) 312, humidity sensor(s) 313 and/or wind sensor(s) and may control a sprinkler device and/or system. In this regard, the sprinkler device and/or system may be connected to one or more output ports of the RGBW controller 300 and may be turned on by the output generated on the one or more output ports of the RGBW controller 300. For example, the RGBW controller 300 may water the lawn when the soil is dry, it is not raining and the temperature is not too hot.

In yet another example, the RGBW controller 300 may receive an input from, for example, one or more temperature sensor(s) 312 and/or humidity sensor(s) 313 and may adjust operation of a thermostat and/or a HVAC system. In this regard, the RGBW controller 300 may send a direct and/or indirect (e.g., through a network manager) message to the thermostat and/or the HVAC system to adjust the temperature and/or humidity settings to a desired level based on the input from the sensory devices. For example, the RGBW controller 300 may be configured to monitor the air quality in a baby's room to maintain optimal air quality conditions.

In yet another example, the RGBW controller 300 may control other devices based on input from one or more input device(s) 310. For example, the RGBW controller 300 may receive input from one or more wind sensor(s) 315 and may initiate closing of roller blinds. In this regard, the RGBW controller 300 may communicate directly or indirectly (e.g., through a network manager) with one or more roller shutter controllers that may be associated with a particular set of roller blinds (e.g., on the windy side of the house) to request from the one or more roller shutter controllers to close the roller blind. For example, the RGBW controller 300 may initiate (e.g., through communication with one or more roller shutter controllers) closing of a particular set of roller blinds to prevent damage to the windows during high wind conditions.

It is to be understood that the particular examples are provided only as example implementations of the various configurations of the RGBW controller 300 and as such these examples do not limit the disclosure.

In an example embodiment of the disclosure, an RGBW controller (e.g., RGBW controller 300) may provide one or more wired and/or wireless interfaces that may enable one or more input devices (e.g., input device(s) 310) to connect to a home network (e.g., home network 100) and/or home network manager (e.g., home network manager 210). For example, if the network manager provides connectivity of various devices to a home network, for example, based on a Z-Wave protocol, the RGBW controller may, for example, contain suitable circuitry, interfaces, logic, and/or code that may enable a particular input device that, for example, may not be compatible with the example Z-Wave protocol (and/ or any other particular protocol that the network manager supports) to connect to the network manager and/or the home network.

Figure 4:
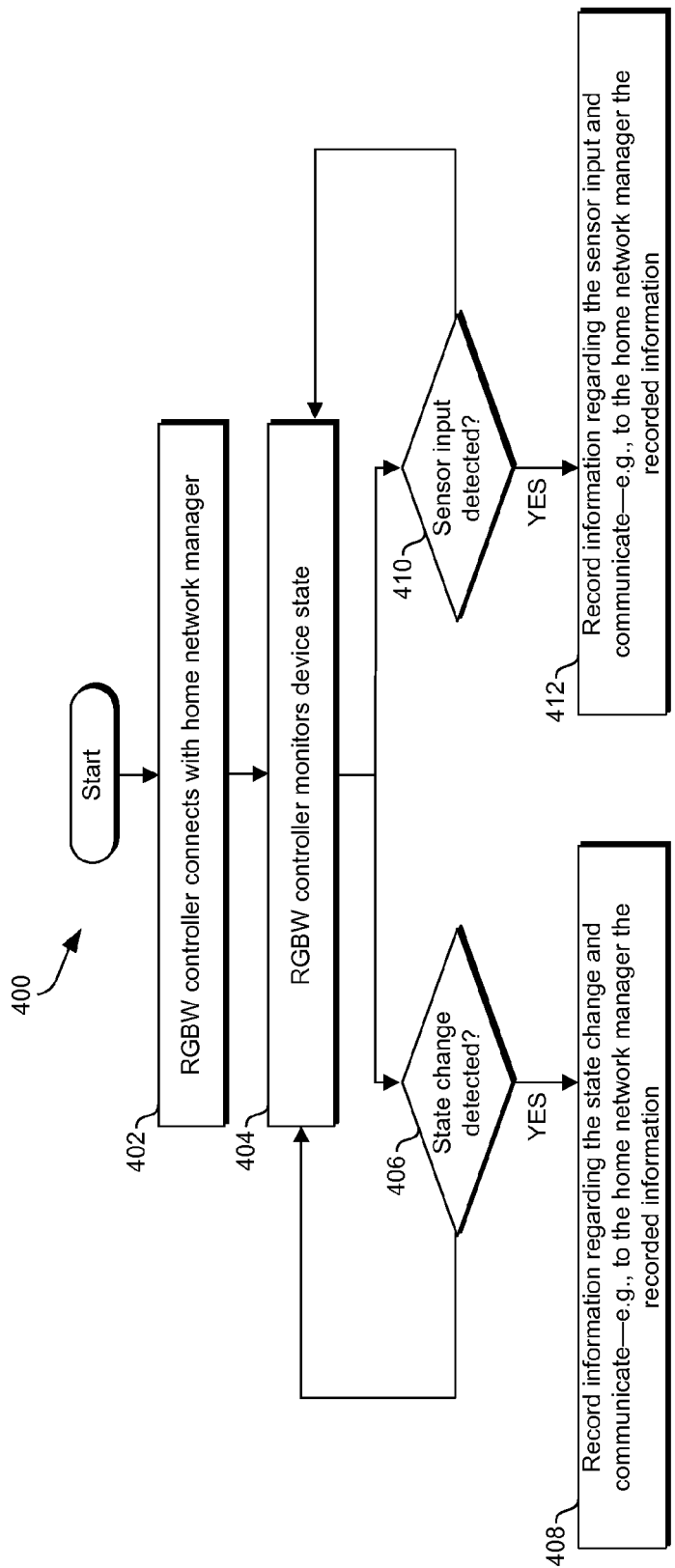
FIG. 4 illustrates an example flow chart of a method for an example process of operation of one or more RGBW controllers.

FIG. 4 illustrates an example flow chart of a method for an example process of operation of one or more RGBW controllers. Referring to FIG. 4, there is shown a flow chart 400 comprising a plurality of example steps.

In example step 402, an RGBW controller (e.g., the RGBW controller 200 as depicted in and/or described with respect to FIG. 2) may connect with a home network manager (e.g., the home network manager 210 as depicted in and/or described with respect to FIG. 2). The connection may comprise a communication link (e.g., the communication link 220 as depicted in and/or described with respect to FIG. 2), such as, for example, a Z-Wave link. The connection may comprise one or more types of wireless and/or wired connections. The connecting may, in some instances, comprise determining whether the RGBW controller is within range of the home network manager. In this regard, the RGBW controller may incorporate a wireless range tester for determining whether the RGBW controller is within a range of a home network manager as described with respect to FIG. 2, for example.

In example step 404, an RGBW controller may monitor device state. The monitoring may be ongoing, periodic, may be initiated by another device (e.g., network device, home network manager) and/or may be initiated by a change a condition (e.g., temperature).

In example step 406, a determination may be made whether a state of a monitored device has changed. For example, a determination may be made whether a device state changed, for example, a switch was activated and/or deactivated. In instances where no state change has been detected, the process may loop back to the example step 404. In instances where a state change has been detected, however, the process may proceed to example step 408.

In example step 408, information regarding the state change may be recorded. The recorded information may then be reported. In this regard, the information may be communicated to other systems (e.g., the home network manager, through communication links between the home network manager and the RGBW controller). In an example embodiment of the disclosure, the recordation step may be optional and/or the information may be communicated outside of the RGBW controller (e.g., to network manager).

In example step 410, a determination may be made whether an input from a sensor device has changed. For example, a determination may be made whether the input from the sensor device has exceeded and/or fallen below a predetermined value (e.g., temperature, humidity, wind factor). In instances where no input change has been detected, the process may loop back to the example step 404. In instances where an input change has been detected, however, the process may proceed to example step 412.

In example step 412, information regarding the input may be recorded. The recorded information may then be reported. In this regard, the information may be communicated to other systems (e.g., the home network manager, through communication links between the home network manager and the RGBW controller). In an example embodiment of the disclosure, the recordation step may be optional and/or the information may be communicated outside of the RGBW controller (e.g., to network manager).

Figure 5:
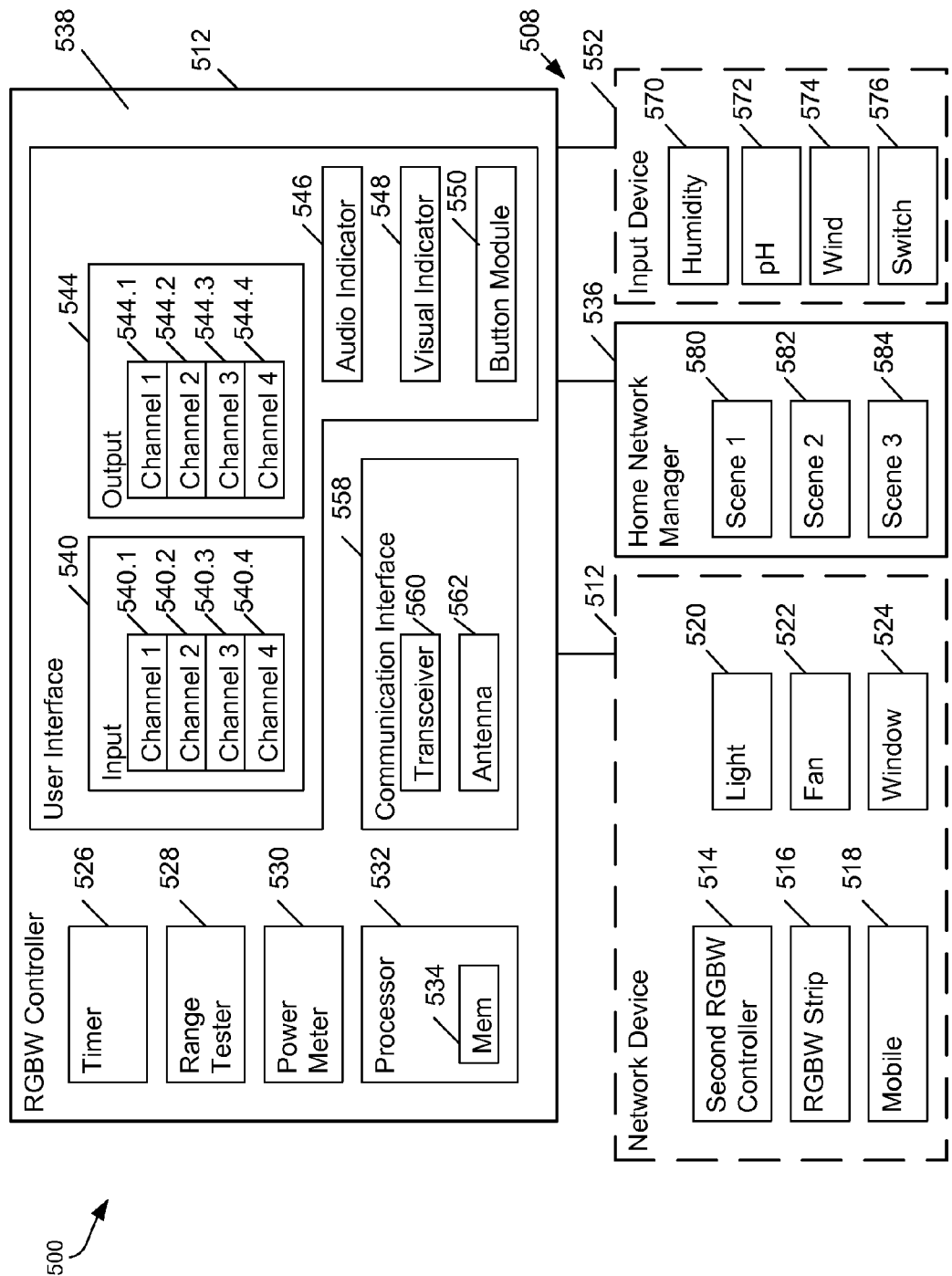
FIG. 5 illustrates an example RGBW control system.

FIG. 5 illustrates an example RGBW control system or control system 500 for use with an RGBW controller 504, similar to the RGBW controller 200 of FIG. 2 and the RGBW controller 120n of FIG. 1, in a home network 508, similar to the home network 100 of FIG. 1, to communicate with one or more network devices 512 in the network 508, such as a second RGBW controller 514, similar to the RGBW controller 120n of FIG. 1 and the RGBW controller 200 of FIG. 2, an RGBW strip 516, also similar to the RGBW device 231 of FIG. 2, a mobile interface 518, similar to the mobile phone 120k of FIG. 1, the laptop computer 120b of FIG. 1, and the interface device 240 of FIG. 2, a light device 520, similar to the lighting fixtures 120e of FIG. 1 and the illumination device 321 of FIG. 3, a fan 522, similar to the fan device 322 of FIG. 3, and a window device 524, similar to the lighting and/or electrical fixtures 120e of FIG. 1. Other network devices, such as, the plurality of home network elements 120a-120n, may also be used as the network device 512, depending on applications.

The RGBW controller 504 may include a timer 526, a range tester 528, a power meter 530, and a controller or a processor 532 which may further include a memory 534. Although the memory 534 is shown as an embedded memory, the memory 534 may also be external to the processor 532. The timer 526 may be configured to determine a time of the day, day of the week, a predefined amount of time, and a sequence of time that has elapsed.

The RGBW controller 504 may use the range tester 528 to determine if the RGBW controller 504 is within an operating range of a home network manager 536 or any of the network devices 512. If the RGBW controller 504 or the range tester 528 determines that the RGBW controller 504 is within an operating range of the home network manager 536, the home network manager 536 may be associated with the RGBW controller 504. In some embodiments, the RGBW controller 504 may be included in the network 508, which may be wireless or wired, through association with the home network manager 536 through the RGBW controller 504, or other network devices, similar to 120a-120n of FIG. 1 or one or more of the network devices 512.

The power meter 530 may be configured to determine an amount of energy consumed by the network devices 512 over a period of time as stored and/or determined by the timer 526. The power meter 530 may transmit data indicative of the energy consumed to the home network manager 536 for analysis, if desired. In some embodiments, data indicative of the energy consumed may also be stored in the memory 534.

The RGBW controller 504 may include a user interface 538 to allow a user to configure or reconfigure some or all of the operations of the RGBW controller 504. In the embodiment shown, an input channel set 540, which further includes a plurality of input channels 540.1 through 540.4, and an output channel set 544, which further includes a plurality of output channels 544.1 through 544.4. In some embodiments, as discussed above, some or all of the input channels 540.1 through 540.4 may be reconfigured to be additional output channels. Similarly, some or all of the output channels 544.1 through 544.4 may also be reconfigured to be additional input channels. In some embodiments, the processor 532 may independently drive the output channels 544.1 through 544.4, as discussed above.

The user interface 538 may also include an optional audio indicator 546, an optional visual indicator 548, and a button module 550. In some embodiments, the audio indicator 546 and/or the visual indicator 548 and the button module 550 may coordinate with the range tester 528 to provide audio and/or visual indication of whether the RGBW controller 504 is within an operating range of the home network manager 536 and/or any of the network devices 512, for direct or indirect communication. For example, a user may depress the button module 550 to test if the RGBW controller 504 is within an operating range of the home network manager 536. The visual indicator 548, for example, in the form of an LED, may emit or display a red light to indicate if the RGBW controller 504 is outside the operating range of the home network manager 536. Conversely, the visual indicator 548 may emit or display a green light to indicate if the RGBW controller 504 is inside the operating range of the home network manager 536. Similarly, the audio indicator 546, for example, in the form of a speaker, may produce a beeping sound to indicate if the RGBW controller 504 is outside the operating range of the home network manager 536. Conversely, the audio indicator 546 may produce a single-pitched sound to indicate if the RGBW controller 504 is inside the operating range of the home network manager 536.

To communicate with the network devices 512, the home network manager 536, or input devices 552, the RGBW controller 504 may include communication interface 558, which may further include a transceiver 560 and/or an antenna 562. Although the antenna 562 is shown as being internal to the RGBW controller 504, the antenna 562 may also be external to the RGBW controller 504 in some embodiments.

In the embodiment shown, the input device 552 may include a humidity sensor 570, similar to the switch device 232 of FIG. 2, an acidity sensor 572, similar to the pH sensor 314 of FIG. 3, a wind sensor 574, similar to the wind sensor 315 of FIG. 3, and a switch device 576, similar to the switch device 232 of FIG. 2. The input device 552 may also one or more of the home network elements 120a-120n of FIG. 1.

In the embodiment shown, the home network manager 536 includes scenes 580, 582, 584. Depending on needs and application, the home network manager 536 may be configured to activate one or more of the scenes 580, 582, 584, based on signals received from the input device 552, a state of the input channels 540.1 through 540.4, and/or the timer 526. For example, in scene 580, the home network manager 536 may activate functions defined in scene 580. Particularly, in scene 580—"cold evening" scene as discussed above, the processor 532 may trigger the light device 520 of a fire place and close the window device 524, in response to predetermined conditions being met, such as, for example, the timer 526 determining that a user has returned home and the time is in the evening, the wind sensor 574 determining a wind speed is above a predefined threshold, and the temperature measured by temperature sensor 312 of FIG. 3 is below a warm threshold.

In some embodiments, in scene 582, a "sequential light switching" scene, the home network manager 536 may trigger the processor 532 to activate the RGBW strip 516 through driving each of the output channels 544.1 through 544.4 independently, and may place a call or email to a predetermined addressee, in response to predetermined conditions being met, such as, for example, the switch 576 having been sequentially activated or toggled a predetermined number of times, within a predetermined amount of time as determined by the timer 526, and the humidity sensor 570 determining that the humidity measured is above a predefined humidity threshold.

In some embodiments, in scene 584, a "fish tank" scene, the home network manager 536 may trigger the processor 532 to activate the light device 520 of a fish tank to a predefined setting, to heat up a warmer in the fish tank to a predetermined temperature, in response to predetermined conditions being met, such as, for example, a carbon dioxide level sensor in the fish tank having reached a predefined level, the timer 526 determining that the time is a particular time of the day, and the sensor 570 placed in the fish tank determining that the temperature is below a predefined threshold.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for an RGBW controller.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A light controller configured to communicate with a network manager on a wireless network and control a plurality of lights, wherein the light controller comprises:
  a network interface configured to communicate wirelessly with the network manager;
  an input configured to receive an input signal from a sensor;
  a first light output configured to control a first light;
  a second light output configured to control a second light;
  a third light output configured to control a third light; and
  wherein the light controller is configured to:
    adjust, in response to the input signal, the first light output, the second light output, and the third light output independently of each other; and adjust, in response to a communication from the network manager, the first light output, the second light output, and the third light output independently of each other.

2. The light controller of claim 1, wherein the first light comprises a red light, the second light comprises a green light, and the third light comprises a blue light.

3. The light controller of claim 1, further comprising a fourth light output configured to control a fourth light, wherein the light controller is further configured to adjust the fourth light output in response to the input signal and, separately, a communication from the network manager.

4. The light controller of claim 3, wherein the first light comprises a red light, the second light comprises a green light, the third light comprises a blue light, and the fourth light comprises a white light.

5. The light controller of claim 1, wherein the sensor comprises at least one of a light sensor, a wind sensor, a temperature sensor, and a humidity sensor.

6. The light controller of claim 1, further comprising a plurality of inputs configured to receive a corresponding plurality of input signals from a corresponding plurality of sensors, wherein the light controller is configured to adjust the first light output, the second light output, and the third light output in response to the plurality of input signals.

7. The light controller of claim 1, wherein the light controller is configured to monitor energy consumption of lights and communicate an amount of consumed energy to the network manager.

8. The light controller of claim 1, further comprising a clock, wherein the light controller is further configured to adjust the first light output, the second light output, and the third light output in response to a time of the clock.

9. The light controller of claim 1, further comprising:
an alarm comprising at least one of an audible alarm or a visual alarm; and
a range tester configured to activate the alarm when the light controller is not in communication with the network manager.

10. The light controller of claim 9, wherein the at least one alarm comprises at least one of the first light, the second light, or the third light.

11. The light controller of claim 1, wherein the light controller is configured to determine whether the input signal satisfies a predetermined condition before adjusting at least one of the first light output, the second light output, or the third light output.

12. The light controller of claim 1, wherein the light controller is configured to illuminate at least one of the first light, the second light, or the third light based in a predetermined manner according to a communications status with the network manager, whereby at least one of:
when the light controller is communicating directly with the network manager, the light controller is configured to illuminate at least one of the first light, the second light, or the third light in a predetermined manner indicative of the direct connection;
when the light controller is communicating indirectly with the network manager such that communications travel through an intermediate device, the light controller is configured to illuminate at least one of the first light, the second light, or the third light in a predetermined manner indicative of the indirect connection; or
when the light controller is not communicating with the network manager, the light controller is configured to illuminate at least one of the first light, the second light, or the third light in a predetermined manner indicative of no communication.

13. The light controller of claim 12, wherein when the light controller is communicating directly with the network manager, the light controller is configured to illuminate at least one of the first light, the second light, or the third light in a predetermined manner indicative of the direct connection.

14. The light controller of claim 12, wherein when the light controller is communicating indirectly with the network manager such that communications travel through an intermediate device, the light controller is configured to illuminate at least one of the first light, the second light, or the third light in a predetermined manner indicative of the indirect connection.

15. The light controller of claim 12, wherein when the light controller is not communicating with the network manager, the light controller is configured to illuminate at least one of the first light, the second light, or the third light in a predetermined manner indicative of no communication.

16. The light controller of claim 1, wherein the light controller is configured to illuminate at least one of the first light, the second light, or the third light based in a predetermined manner according to a communications status with the network manager, whereby at least one of:
when the light controller is communicating with the network manager, the light controller is configured to illuminate at least one of the first light, the second light, or the third light in a predetermined manner indicative of communication; and
when the light controller is not communicating with the network manager, the light controller is configured to illuminate at least one of the first light, the second light, or the third light in a predetermined manner indicative of no communication.

17. The light controller of claim 16, wherein when the light controller is communicating indirectly with the network manager such that communications travel through an intermediate device, the light controller is configured to illuminate at least one of the first light, the second light, or the third light in a predetermined manner indicative of the indirect connection.

* * * * *